United States Patent
Agrawal et al.

(10) Patent No.: US 12,229,397 B2
(45) Date of Patent: Feb. 18, 2025

(54) CONTROLLER GRAPHICAL USER INTERFACE BASED ON INTERACTION DATA

(71) Applicant: Motorola Mobility LLC, Chicago, IL (US)

(72) Inventors: Amit Kumar Agrawal, Bangalore (IN); Satyabrata Rout, Bangalore (IN); J Amarnath, Basti (IN); Gokula Ramanan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/107,092

(22) Filed: Feb. 8, 2023

(65) Prior Publication Data

US 2024/0264734 A1 Aug. 8, 2024

(51) Int. Cl.
 *G06F 3/0488* (2022.01)
 *G06V 10/40* (2022.01)

(52) U.S. Cl.
 CPC ............ *G06F 3/0488* (2013.01); *G06V 10/40* (2022.01)

(58) Field of Classification Search
 CPC ...... G06F 3/0488; G06F 3/041–04886; G06V 10/40; A63F 13/04; A63F 13/214; A63F 13/2145
 See application file for complete search history.

(56) References Cited

U.S. PATENT DOCUMENTS

| 11,583,760 B1 | 2/2023 | Agrawal et al. |
| 2013/0067422 A1* | 3/2013 | Hong .................... G06F 3/0346 715/863 |

(Continued)

FOREIGN PATENT DOCUMENTS

| CN | 106648025 A | 5/2017 |
| CN | 113126862 A | 7/2021 |

(Continued)

OTHER PUBLICATIONS

Agrawal, Amit Kumar, et al., U.S. Appl. No. 18/107,134, filed Feb. 8, 2023, 57 pages.

(Continued)

*Primary Examiner* — Temesghen Ghebretinsae
*Assistant Examiner* — Sosina Abebe
(74) *Attorney, Agent, or Firm* — FIG. 1 Patents

(57) ABSTRACT

Techniques for controller graphical user interface based on interaction data are described and are implementable to generate a controller graphical user interface for display by a first device to control digital content displayed on a second device. For instance, an application such as a mobile gaming application is displayed on a mobile device and digital content from the application is communicated for display by a display device as part of a content connectivity session. One or more control regions of the application are determined based on a monitored interaction with a user interface of the mobile device. One or more control graphics are identified that correlate to the one or more control regions. A controller graphical user interface is generated that displays the one or more control graphics and filters out extraneous digital content. The controller graphical user interface is then displayed by the mobile device.

20 Claims, 9 Drawing Sheets

(56) References Cited

U.S. PATENT DOCUMENTS

| | | | | |
|---|---|---|---|---|
| 2013/0217498 | A1* | 8/2013 | Wang | A63F 13/2145 |
| | | | | 463/37 |
| 2013/0249819 | A1* | 9/2013 | Akifusa | A63F 13/2145 |
| | | | | 345/173 |
| 2014/0179423 | A1* | 6/2014 | Deng | A63F 13/235 |
| | | | | 463/31 |
| 2014/0277843 | A1* | 9/2014 | Langlois | G01C 21/3661 |
| | | | | 701/2 |
| 2014/0349757 | A1* | 11/2014 | Nogami | H04N 21/4781 |
| | | | | 463/31 |
| 2016/0283063 | A1* | 9/2016 | Missig | G06F 3/0488 |
| 2017/0258449 | A1 | 9/2017 | Nielsen et al. | |
| 2017/0277498 | A1* | 9/2017 | Wood, Jr. | G06F 3/0481 |
| 2017/0371844 | A1 | 12/2017 | Yao | |
| 2019/0056962 | A1 | 2/2019 | Ng et al. | |
| 2019/0147721 | A1 | 5/2019 | Avitan et al. | |
| 2019/0156788 | A1* | 5/2019 | Lee | H04M 1/72409 |
| 2020/0285438 | A1* | 9/2020 | Lagnado | G09G 3/3406 |
| 2024/0264729 | A1 | 8/2024 | Meirhaeghe et al. | |

FOREIGN PATENT DOCUMENTS

| | | |
|---|---|---|
| CN | 113868269 A | 12/2021 |
| CN | 114489398 A | 5/2022 |
| JP | 2013148990 A | 8/2013 |
| NO | 20181316 A1 | 3/2020 |
| WO | 2017033569 A1 | 3/2017 |

OTHER PUBLICATIONS

Meirhaeghe, Olivier D, et al., U.S. Appl. No. 18/107,171, filed Feb. 8, 2023, 50 pages.

U.S. Appl. No. 18/107,171 , "Non-Final Office Action", U.S. Appl. No. 18/107,171, Dec. 12, 2024, 38 pages.

* cited by examiner

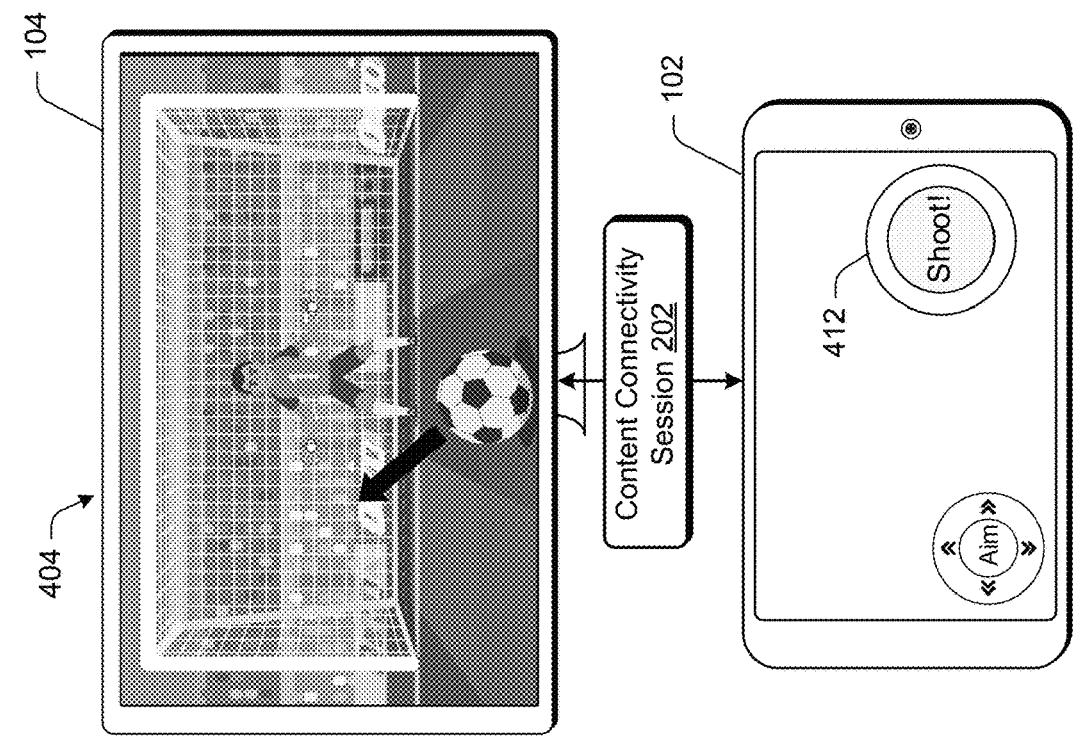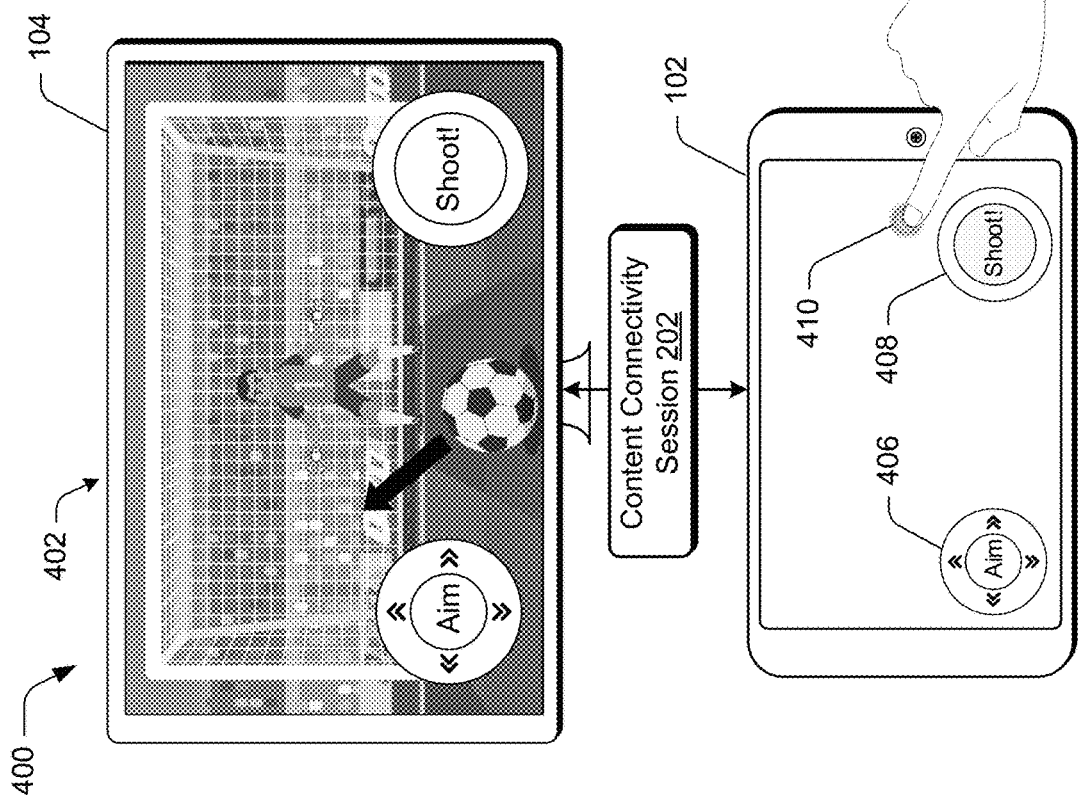
Fig. 4

CONTROLLER GRAPHICAL USER INTERFACE BASED ON INTERACTION DATA

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. Many people have access to multiple different devices and use of a particular device depends on the person's current status, such as on the go, in the office, at home, and so forth. While individual instances of devices provide functionality for discrete sets of tasks, the ability for devices to intercommunicate with one another greatly expands available task options and operating environments. For instance, a typical smartphone is able to wirelessly cast visual content to a larger screen device to enable enhanced enjoyment of the content.

In the context of mobile gaming, however, current techniques for device intercommunication are limited. For instance, dedicated devices such as analog controllers are available that provide for input to other devices such as laptops and desktops. However, these devices represent additional devices that a user must manage, and further do not support touch-based games. Some smartphones are able to perform "screen mirroring" to replicate content displayed on the smartphone on an external device. However, screen mirroring is computationally expensive, which introduces "lag" to gameplay as well as rapidly consumes battery resources. Thus, conventional techniques for device intercommunication in a gaming context are computationally expensive and lead to a diminished user experience.

BRIEF DESCRIPTION OF THE DRAWINGS

Aspects of controller graphical user interface based on interaction data are described with reference to the following Figures. The same numbers may be used throughout to reference similar features and components that are shown in the Figures:

FIG. 4 depicts an example implementation for controller graphical user interface based on interaction data including updating a controller graphical user interface in accordance with one or more implementations.

DETAILED DESCRIPTION

Figure 1:
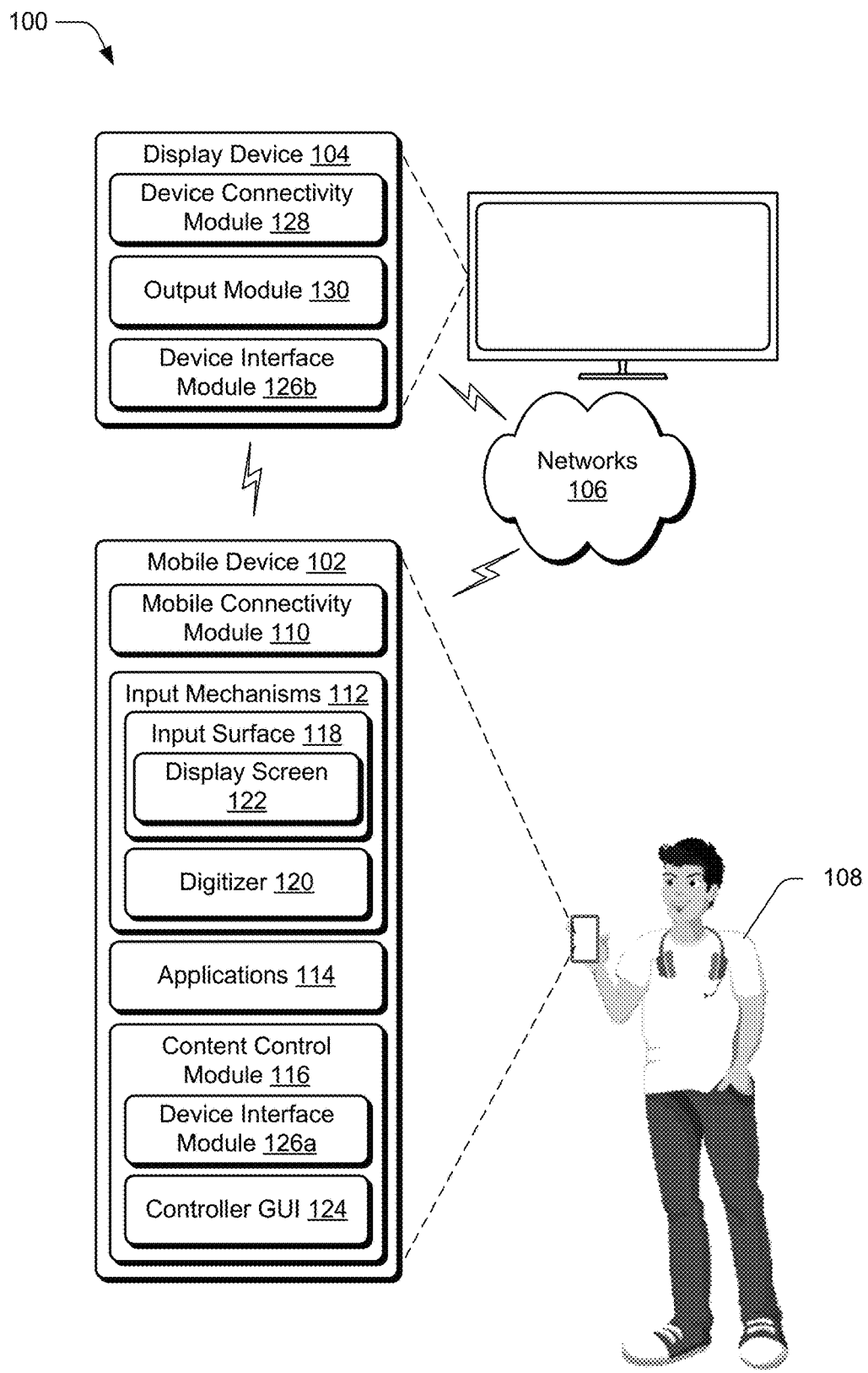
FIG. 1 illustrates an example environment in which aspects of controller graphical user interface based on interaction data can be implemented.

Techniques for controller graphical user interface based on interaction data are described and are implementable to generate a controller graphical user interface for display by a first device, e.g., a mobile device, to control digital content displayed on a second device, e.g., a remote display device. The described implementations, for instance, enable generation of a controller graphical user interface based on touch data obtained locally by the mobile device to control an application, e.g., a gaming application, displayed on the remote display device. The controller graphical user interface includes control graphics and filters out extraneous digital content which conserves computational resources, increases device battery life, and results in an enhanced user experience.

According to various implementations, a first computing device, e.g., a mobile device, is operable to establish a content connectivity session between the mobile device and a second computing device, e.g., a remote display device. Generally, the mobile device establishes connectivity (e.g., wireless and/or wired connectivity) with the remote display device and communicates digital content to the remote display device for output. Accordingly, as part of the content connectivity session, content that is displayed on the mobile device can be displayed on the remote display device, in whole or in part. For example, the mobile device is operable to cause the remote display device to "mirror" a graphical user interface that is displayed on the mobile device. In such an example, the remote display device displays similar and/or same digital content that is displayed on the mobile device.

In various contexts, it is advantageous to display different digital content on the mobile device than is displayed on the remote display device. Consider an example in which the mobile device displays a gaming application that depicts digital content. In this example, as part of the content connectivity session, the mobile device communicates the digital content of the gaming application to the remote display device for display. The mobile device can monitor an interaction with the gaming application, such as a user interaction to actuate a touchscreen of the mobile device. For example, the mobile device can detect, using one or more touch sensors, a location, intensity, frequency, etc. of instances of a user "touching" the touchscreen during gameplay. Based on the monitored interaction, the mobile device determines one or more control regions of the gaming application.

Generally, a control region corresponds to a spatial location of a graphical user interface of the gaming application, such that actuation of the control region causes a corresponding action to be performed within the gaming application. For instance, the control region corresponds to an "actuatable" area surrounding one or more of an action button, directional pad, digital joystick, etc. displayed by the application. In an example, the one or more control regions are determined based on a frequency of touch. For instance, a spatial location of the gaming application that is frequently touched by a user of the mobile device is indicative that actuation of the spatial location causes a corresponding action to be performed in the gaming application. The mobile device can also determine the control regions based on one or more additional factors, such as predefined user preferences, saved data associated with the user, metadata associated with the gaming application (e.g., global information from a plurality of users of the application), etc.

The mobile device is further operable to identify one or more control graphics of the digital content depicted by the gaming application. Generally, the control graphics refer to visual representations of the control regions. For instance, the control graphics are visual features of the digital content that denote an actuatable area, such as a visual representation of an action button, directional pad, digital joystick, etc. Accordingly, the mobile device can identify one or more visual features of the digital content and determine a correlation between the one or more visual features and the identified control regions. Based on the correlation, the mobile device can identify the control graphics.

The mobile device can then generate a controller graphical user interface by filtering the digital content to display the one or more control graphics. In one example, the mobile device does so by capturing a "screenshot" of the digital content depicted by the gaming application and filtering out regions of the screenshot that do not correspond to the one or more control graphics. Thus, the controller graphical user interface can be configured to display the control graphics without extraneous visual features of the digital content, which conserves computational resources. In some examples, the mobile device adjusts a location, size, and/or appearance of the control graphics in the controller graphical user interface. For instance, the mobile device can enlarge a particular control graphic and/or adjust the location of the particular control graphic to enhance gameplay for a user.

The mobile device then displays the controller graphical user interface, and further causes the gaming application to be displayed on the remote display device. In some examples, the mobile device edits the digital content to be displayed by the remote display device. By way of example, the mobile device generates gameplay digital content that does not include the control graphics. Thus, the mobile device is operable to provide an enhanced view of the digital content to the remote display device that depicts gameplay without visual obstruction of the control graphics. The mobile device is further operable to iteratively update features of the controller graphical user interface for the duration that the gaming application is open, and thus is adaptable to individual user behaviors throughout gameplay.

Accordingly, using the techniques described herein, the mobile device is operable to conserve computational resources and create an enhanced user experience by generating a controller graphical user interface that displays relevant control graphics while filtering extraneous digital content.

While features and concepts of controller graphical user interface based on interaction data can be implemented in any number of environments and/or configurations, aspects of the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of controller graphical user interface based on interaction data can be implemented. The environment 100 includes a mobile device 102 and a display device 104 which are interconnectable by a network 106 to enable content from the mobile device 102 to be displayed by the display device 104, for instance as part of a content connectivity session. In this particular example, the mobile device 102 represents a portable device that can be carried by a user 108, such as a smartphone or a tablet device. Further, the display device 104 represents a remote display device such as a laptop computer, external monitor, smart television screen, a desktop computer, augmented reality ("AR") and/or virtual reality ("VR") devices (e.g., AR/VR glasses, projectors, headsets, etc.), and so forth. These examples are not to be construed as limiting, however, and the mobile device 102 and/or the display device 104 can be implemented in a variety of different ways and form factors. Example attributes of the mobile device 102 and the display device 104 are discussed below with reference to the device 700 of FIG. 7.

The mobile device 102 includes various functionality that enables the mobile device 102 to perform different aspects of controller graphical user interface based on interaction data discussed herein, including a mobile connectivity module 110, input mechanisms 112, one or more applications 114, and a content control module 116. The mobile connectivity module 110 represents functionality (e.g., logic and hardware) for enabling the mobile device 102 to interconnect with other devices and/or networks, such as the display device 104 and the network 106. The mobile connectivity module 110, for instance, enables wireless and/or wired connectivity of the mobile device 102.

The input mechanisms 112 represent functionality for enabling input to the mobile device 102, such as user input to invoke functionality of the mobile device 102. The input mechanisms 112, for instance, include an input surface 118 and a digitizer 120. Generally, the input surface 118 represents functionality for receiving proximity-based input to the mobile device 102, such as stylus input, user touch input, contactless input based on proximity of a user's finger and/or a stylus to the mobile device 102, and so forth. In various examples, the input surface 118 includes one or more touch sensors. The input surface 118, for example, is implemented via a display screen 122 of the mobile device 102 that is interconnected with the digitizer 120, such as a "touchscreen" of the mobile device 102. For instance, the digitizer 120 receives input to the display screen 122 and converts the input into digital signals that are utilized by the mobile device 102 as input signals.

The one or more applications 114 represent functionality for performing different computing tasks via the mobile device 102, such as gaming (e.g., mobile and/or touch-based gaming), media consumption (e.g., content streaming), productivity tasks (e.g., word processing, content generation, data analysis, etc.), web browsing, communication with other devices, and so forth. The content control module 116 represents functionality for performing various aspects of controller graphical user interface based on interaction data described herein. Generally, the content control module 116 is operable to generate a controller graphical user interface (GUI) 124, for instance for display by the display screen 122. As further detailed below, for instance, the controller graphical user interface 124 is displayed on the display screen 122 for receiving input to control functionality and/or execution of instances of the applications 114.

The content control module 116 is further operable to generate digital content to be displayed by the display device 104, such as including digital content from instances of the applications 114. The content control module 116 includes a device interface module 126a that represents functionality for enabling the mobile device 102 to interface with other devices. As further detailed below, the device interface module 126a enables the mobile device 102 to establish wireless and/or wired data communication with other devices, e.g., the display device 104, as part of a content connectivity session.

The display device 104 represents functionality for various types of content output, such as output of visual and audible content. The display device 104 can be implemented in various ways, such as a television (e.g., a smart TV), a display panel, a projector display, a computing device with an associated display device, an external monitor, and so forth. In at least one implementation the display device 104 represents a dedicated display device configured to output visual content generated by other devices, such as content generated at the mobile device 102 and transmitted to the display device 104 for display. Alternatively or additionally, the display device 104 includes computing functionality.

The display device 104 includes various functionality for enabling the display device 104 to output content such as content received from the mobile device 102, including a device interface module 126b, a device connectivity module 128, and an output module 130. The device connectivity module 128 represents functionality (e.g., logic and hardware) for enabling the display device 104 to interconnect with other devices and/or networks, such as the mobile device 102 and the network 106. The device connectivity module 128, for instance, enables wireless and/or wired connectivity of the display device 104 such as for receiving content from other devices for display. In at least one implementation the device connectivity module 128 connects to the network 106 (e.g., via wireless and/or wired connectivity) for intercommunication with other devices and/or networks. Alternatively or additionally the device connectivity module 128 enables direct device-to-device connectivity with other devices, such as the mobile device 102. The mobile connectivity module 110 of the mobile device 102 and the device connectivity module 128 of the display device 104, for instance, are configured to communicate via a variety of different wireless protocols, such as Wireless Local Area Network (WLAN) (e.g., Wi-Fi), Wi-Fi Direct, wireless short distance communication (e.g., Bluetooth™ (including BLE), Near Field Communication (NFC)), and so forth.

The output module 130 represents functionality for enabling content output by the display device 104, such as visual content and audible content. The output module 130, for instance, includes a display driver and/or other logic and hardware to output content by the display device 104. The device interface module 126b is representative of functionality for enabling the display device 104 to interface with other devices. For instance, the device interface module 126b interfaces with the device interface module 126a of the mobile device 102 to enable collaborative data communication between the display device 104 and the mobile device 102. In at least one implementation the device interface module 126b is optional to the display device 104.

Having discussed an example environment in which the disclosed techniques can be performed, consider now some example scenarios and implementation details for implementing the disclosed techniques.

Figure 2:
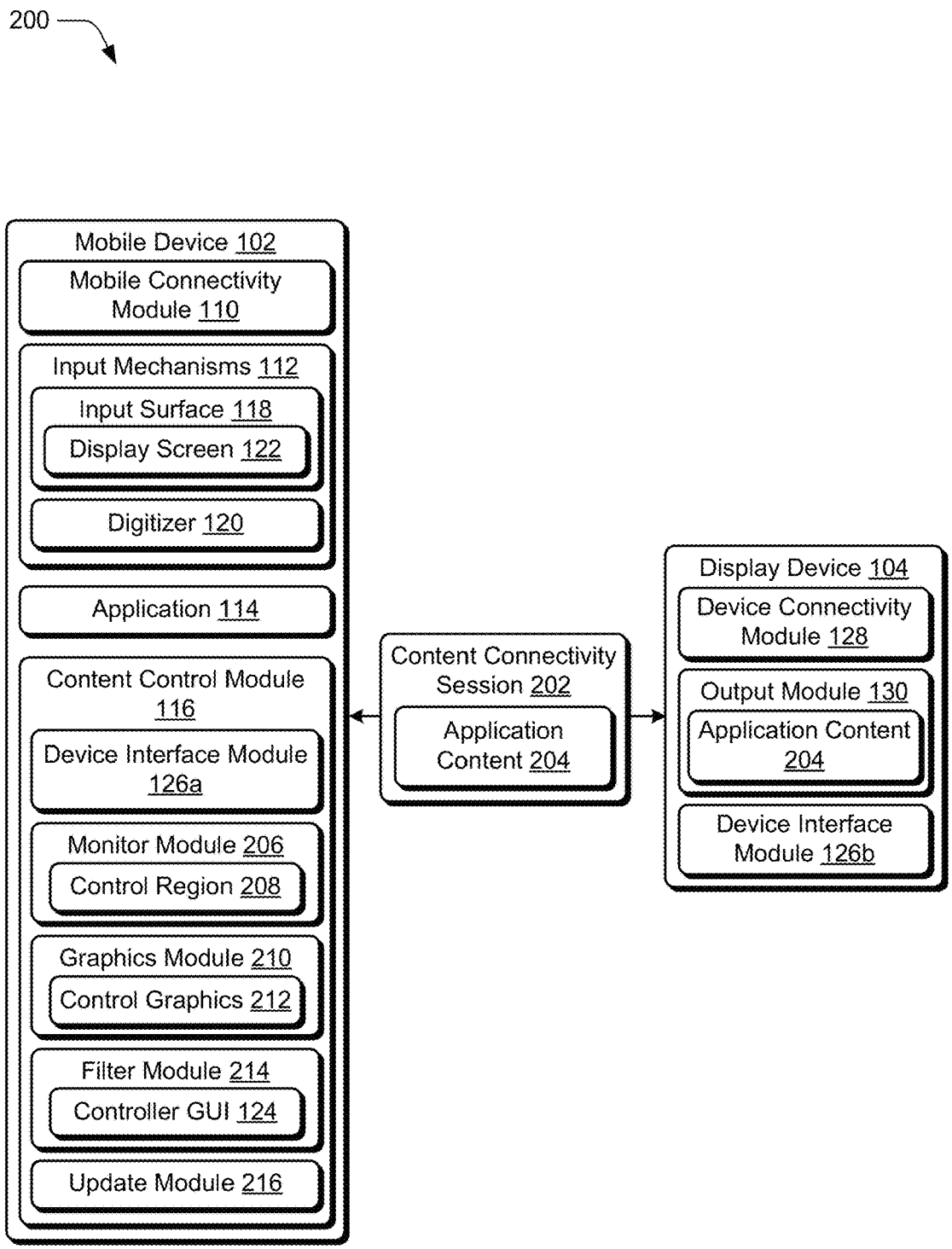
FIG. 2 depicts an example system for controller graphical user interface based on interaction data in accordance with one or more implementations.

FIG. 2 depicts an example system 200 for controller graphical user interface based on interaction data in accordance with one or more implementations. The system 200 can be implemented in the environment 100 and incorporates attributes of the environment 100 introduced above.

In the example system 200, a content connectivity session 202 is established between the mobile device 102 and the display device 104. The content connectivity session 202, for instance, enables the mobile device 102 to transmit content to the display device 104 for output via wireless and/or wired connectivity. In at least one implementation the content connectivity session 202 is established via negotiation between the mobile connectivity module 110 and the device connectivity module 128. Alternatively or additionally, the content connectivity session 202 is established via communication between the device interface module 126a and the device interface module 126b.

In various examples, the content connectivity session 202 is initiated by a user 108, for instance responsive to a user prompt displayed by the display screen 122. In alternative or additional examples, the content connectivity session 202 is established automatically and without user intervention, such as responsive to an application 114 being launched by the mobile device 102 and/or detection of the display device 104 in proximity to the mobile device 102. In an example, the application 114 is a mobile gaming application, however this is by way of example and not limitation and the techniques described herein are extensible to a variety of types of applications.

As part of the content connectivity session 202, the mobile device 102 can display digital content from the application 114 via the display screen 122 and generate application content 204 to be communicated to the output module 130 for display. The mobile device 102 is operable to edit the application content 204 such that the application content 204 may be effectively displayed by the display device 104, e.g., adjusting an aspect ratio and/or resolution of the application content 204.

In one example, the mobile device 102 initially displays the application 114 in the display screen 122 as well as communicating application content 204 to the display device 104 for display that includes similar or the same digital content that is displayed by the mobile device 102. For instance, the display device 104 is initially configured to "mirror" the digital content displayed by the mobile device 102. As further described below with respect to FIG. 4, in some examples, the mobile device 102 is configured to initially display the controller graphical user interface 124, such as in an example where a user 108 has previously utilized the application 114.

A monitor module 206 is operable to monitor a user interaction with a user interface of the mobile device 102 to determine one or more control regions 208. Generally, the control regions 208 correspond to one or more spatial locations of a graphical user interface of the application 114, such that actuation of one or more of the control regions 208 causes a corresponding action to be performed in the application 114. For instance, a particular control region 208 corresponds to an "actuatable area" surrounding one or more of an action button, directional pad, digital joystick, selectable menu, etc.

In an example, the monitor module 206 monitors proximity-based input to the input surface 118, such as stylus input, user touch input, contactless input based on proximity of a user's finger and/or a stylus to the mobile device 102, and so forth to determine the one or more control regions 208. For instance, the monitor module 206 is operable to detect, using one or more touch sensors of the input surface 118, a location, intensity, distribution, length of time, frequency, etc. of instances proximity-based input. Accordingly, the control regions 208 can be determined based one or more of such factors. The control regions 208 can further be based in whole or in part on one or more additional factors, such as preferences associated with a user 108 of the mobile device 102, saved data associated with the user 108 (e.g., based on a previous content connectivity session), metadata associated with the application 114 (e.g., global information from a plurality of users of the application), etc.

Various strategies and techniques are considered to determine the one or more control regions 208. In one example, the monitor module 206 generates a heat map based on proximity-based input to the input surface 118. In this example, the control regions 208 are based in part or in whole on the heat map. In an additional or alternative example, the monitor module 206 implements a control region algorithm that considers each instance of proximity-based input to the input surface 118 over a period of time to determine the one or more control regions 208. The control region algorithm applies weights to each instance of proximity-based input, such as based on one or more of a duration of time of the instance (e.g., how long the user 108 touches the display screen 122), intensity of the instance (e.g., how hard the user 108 touches the display screen 122), and/or a comparison of the instance to other instances (e.g., how "close" to other touches the instance is).

The monitor module 206 may also include logic and/or implement techniques to suppress outlier instances of proximity-based input, such as "accidental" touches by the user 108. For instance, the monitor module 206 may disregard an instance of proximity-based input that deviates significantly (in location, intensity, duration, etc.) from other instances of proximity-based input when determining the control regions 208. By way of example, a user 108 of the mobile device brushes a piece of food off of the display screen 122 and inadvertently touches the display screen 122. The monitor module 206 is operable to recognize this touch as inadvertent, e.g., based on a deviation from other touches, and suppress the inadvertent touch when determining the control regions 208.

The monitor module 206 is further operable to define an area for the control region 208, e.g., a polygon surrounding and/or encompassing various instances of proximity-based input. In one example, the monitor module 206 does so using one or more cluster analysis techniques, such as algorithmic, machine learning, and/or image analysis techniques. This is by way of example and not limitation, and a variety of suitable methods and techniques for determining the control regions 208 are contemplated.

A graphics module 210 is operable to identify one or more control graphics 212 of the digital content depicted by the application 114. The graphics module 210 does so, for instance, by correlating one or more visual features of the digital content to the one or more identified control regions 208. Generally, the control graphics 212 refer to visual representations of the control regions 208. For instance, the control graphics 212 are visual features of the application 114 that denote a control region 208, such as a visual representation of an action button, directional pad, digital joystick, selectable menu, etc.

Various strategies and techniques are considered to determine the one or more control graphics 212. In one example, the one or more control graphics 212 are determined based in part on a configuration session that includes receiving user input to the mobile device 102 to identify the one or more control regions 208 and/or the control graphics 212. For instance, the graphics module 210 is operable to provide prompts via the display screen 122 for the user 108 to identify, via proximity-based input, locations that correspond to the one or more control regions 208 and/or visual features that correspond to the control graphics 212.

In an additional or alternative example, the graphics module 210 is operable to segment the digital content of the application 114 into constituent visual features, e.g., by leveraging a digital image segmentation algorithm. The graphics module 210 calculates an epicenter of each of the one or more control regions 208, as well as calculates a centroid for each constituent visual feature. In this example, the graphics module 210 determines a closest constituent visual feature to the epicenter of each control region 208, e.g., by comparing the epicenters of the control regions 208 to the centroids of the constituent visual features.

In another example, the graphics module 210 implements one or more image recognition techniques to identify one or more candidate visual features that likely correspond to the one or more control regions 208. For instance, the graphics module 210 can identify shapes and/or words included in the digital content of the application 114 that indicate a control region 208. Consider, for example, a driving game application that includes an action button including a green circle that says "Go" and another action button that includes a stop sign with the word "Stop." The graphics module 210 leverages image recognition techniques to identify these two action buttons as likely being control graphics 212, e.g., based on the text, coloration, and/or shape of the action buttons.

In at least one example, one or more of control regions 208 are "invisible" in the context of the gaming application and the control regions 208 are not associated with a visual feature of the application content 204. In such an example, the mobile device 102 is operable to generate one or more graphics to represent the one or more control regions 208. Consider, for example, a gaming application that involves a user pressing a right portion of the display screen 122 to turn an avatar to the right, while pressing a left portion of the display screen 122 turns the avatar to the left. The graphics module 210 is operable to generate control graphics 212 to represent this functionality, e.g., an icon and/or action button to turn the avatar to the right and an icon and/or action button to turn the avatar to the left. The above description is by way of example and not limitation, and a variety of suitable methods and techniques for determining the control graphics 212 are considered.

A filter module 214 is operable to generate a controller graphical user interface 124 by filtering the digital content to display the one or more control graphics 212. Generally, the controller graphical user interface 124 represents a "controller" that is usable to receive user input to control functionality of the application 114. For instance, the controller graphical user interface 124 depicts a gaming controller that is operable to control functionality of a gaming application displayed by the display device 104. In an example, the filter module 214 generates the controller graphical user interface 124 by capturing a screenshot (e.g., a still image from a discrete point in time) of the digital content of the application 114 and filtering out regions of the screenshot that do not correspond to the one or more control graphics 212.

In some instances, the filter module 214 uses an image segmentation algorithm to generate the controller graphical user interface 124. In an additional or alternative example, the filter module 214 generates an image mask that suppresses digital content that is not within the one or more control regions 208. In some implementations, the mobile device 102 adjusts a location, size, and/or appearance of the control graphics 212 in the controller graphical user interface 124. For instance, the mobile device 102 can enlarge a particular control graphic 212 and/or adjust the location of the particular control graphic 212 to enhance gameplay for a user.

The mobile device 102 then displays the controller graphical user interface 124 such as via the display screen 122. Further, the mobile device 102 causes application content 204 to be communicated to the display device 104 for display, for instance as output by the output module 130. As mentioned above, the mobile device 102 can edit the application content 204 such that it may be effectively displayed by the display device 104, e.g., adjusting an aspect ratio and/or resolution of the application content 204. In some implementations, the mobile device 102 further edits the application content 204 to filter out one or more of the control graphics 212, such as by using one or more of the filtering techniques described above. Accordingly, the application content 204 communicated to the display device 104 includes an enhanced view of the digital content of the application 114 without visual obstruction of the control graphics.

Further, an update module 216 is operable to edit the controller graphical user interface 124 throughout the course of the content connectivity session 202, as well as update the controller graphical user interface 124 in subsequent content connectivity sessions. The update module 216, for instance, edits the position, size, orientation, location, and/or appearance of one or more of the control graphics 212 included in the controller graphical user interface 124 based on subsequent monitored interactions with the input surface 118. Consider, for instance, a gameplay scenario in which a user 108 of the mobile device is utilizing a mobile device 102 displaying a controller graphical user interface 124 to control a gaming application. In this example, the user 108 provides a plurality of instances of proximity-based input (e.g., touches) that are near a border of a previously determined control region 208. The update module is operable to detect one or more updated control regions, and in accordance with the techniques described above, generate an updated controller graphical user interface including updated control graphics, such as an updated control graphic that is larger than the previous control graphic 212. This functionality is further described below in more detail with respect to FIG. 4.

Figure 3A:
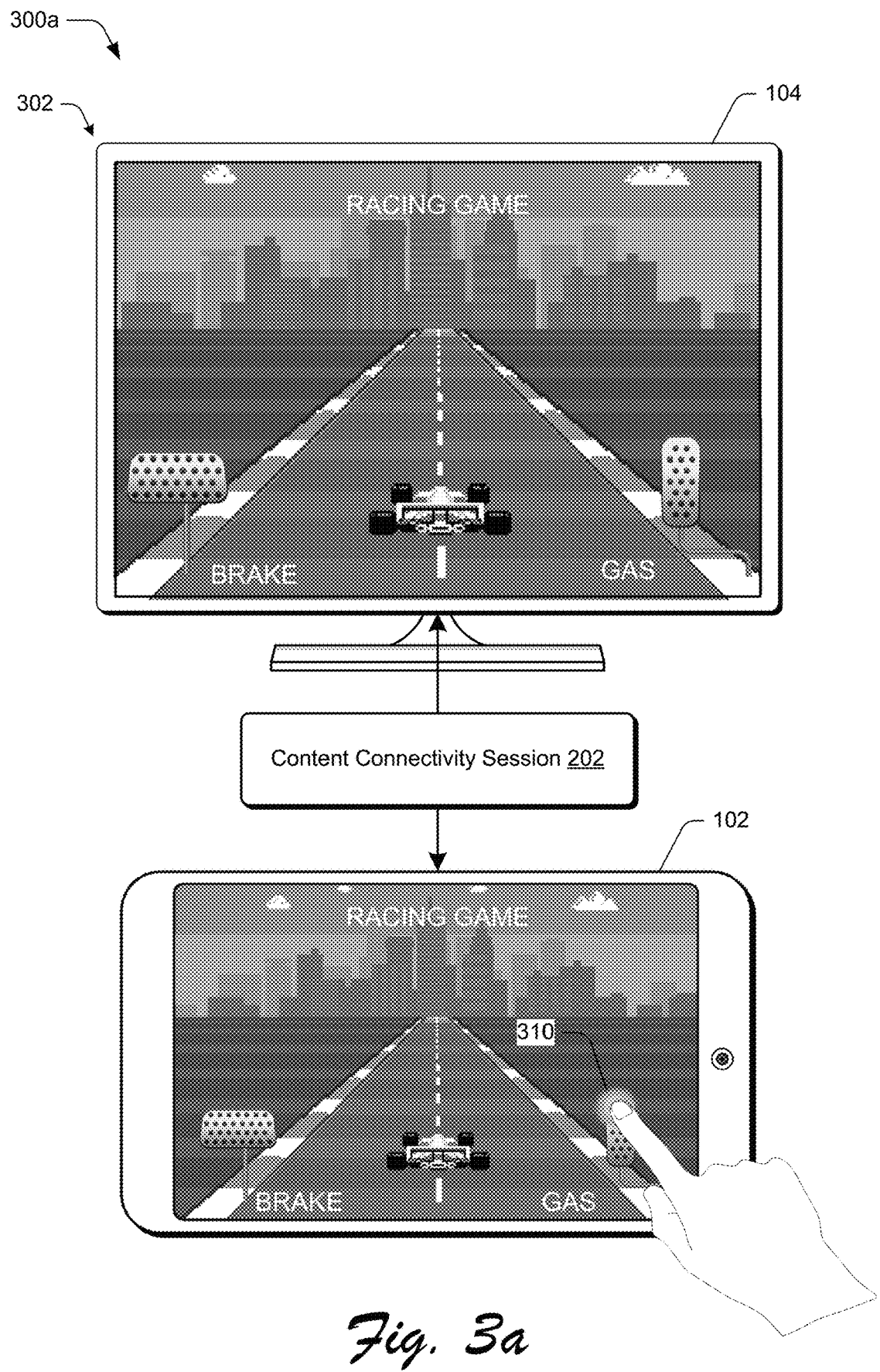
FIGS. 3a, 3b, and 3c depict an example implementation for controller graphical user interface based on interaction data in accordance with one or more implementations.
Figure 3B:
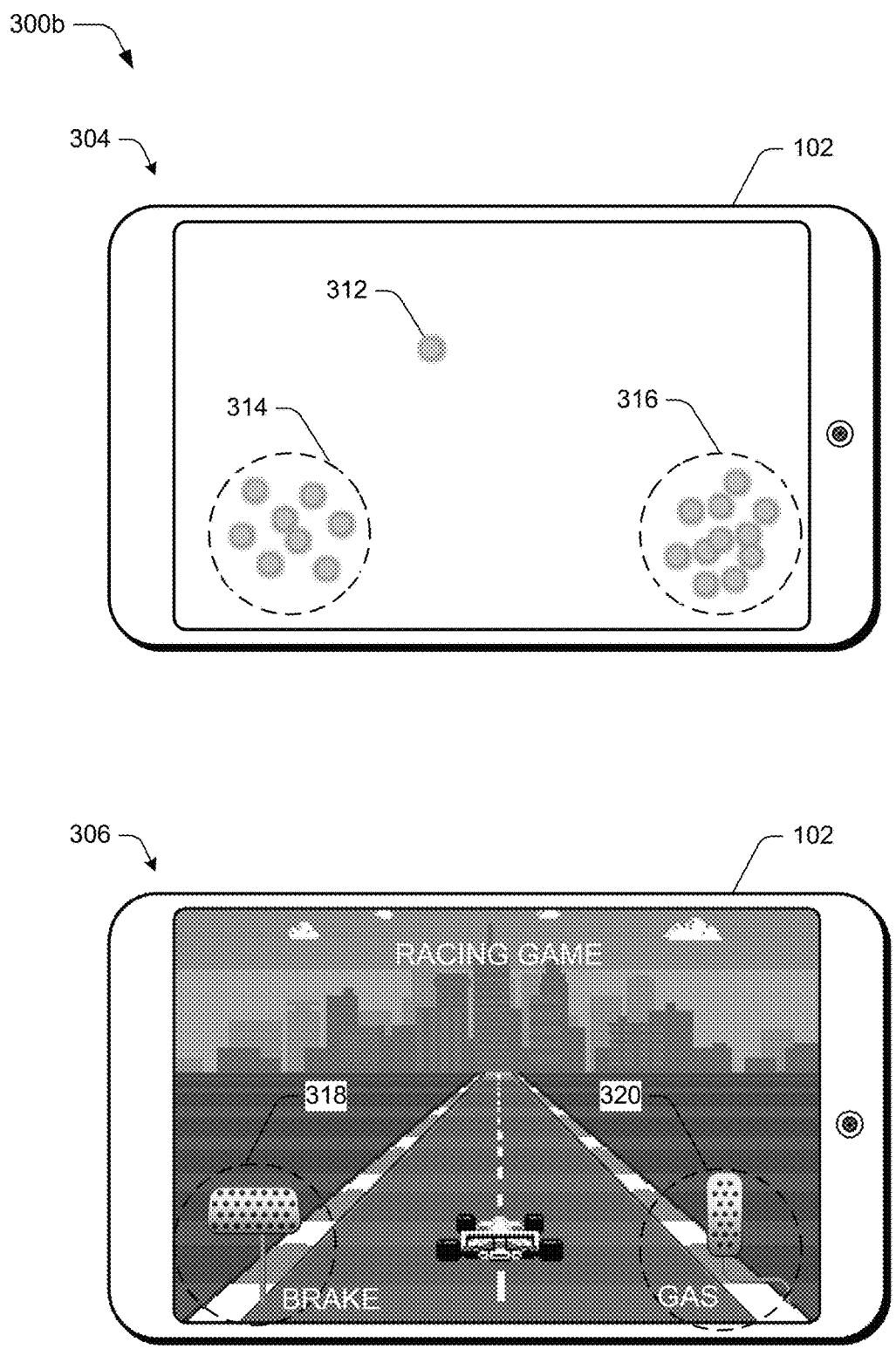
Figure 3C:
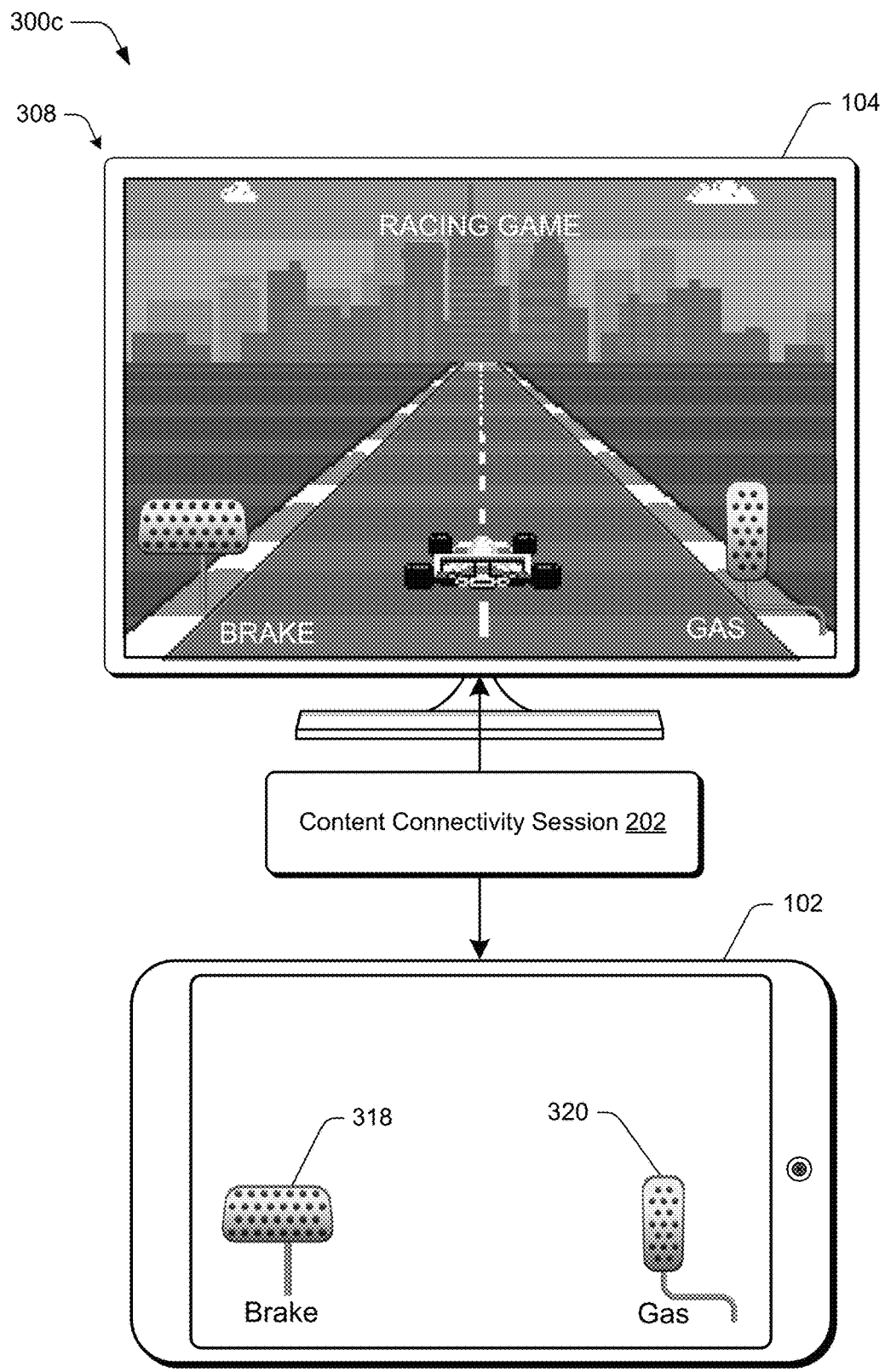

FIGS. 3a, 3b, and 3c depict an example implementation 300a, 300b, and 300c for controller graphical user interface based on interaction data in accordance with one or more implementations. In this example, shown in first stage 302, second stage 304, third stage 306, and fourth stage 308, the mobile device 102 is operable to generate a controller graphical user interface 124 for an application 114, which in this example is a gaming application such as a racing game. As shown in first stage 302, a mobile device 102 establishes a content connectivity session 202 between the mobile device 102 and a display device 104. As part of the content connectivity session 202, the mobile device 102 displays digital content from the gaming application and causes the display device 104 to display similar digital content. The mobile device 102 monitors interactions with the gaming application, such as proximity-based input to a display screen 122 of the mobile device 102. An instance 310 of proximity-based input is depicted in this example as a user input to touch the input surface 118, such as to touch a visual representation of a "gas pedal" in a user interface of the mobile device 102.

As depicted in second stage 304, the mobile device 102 monitors a plurality of instances of proximity-based input to the mobile device 102 via one or more touch sensors of the input surface 118. In this example, each instance of proximity-based input represents a user interaction with the input surface 118 and is depicted as a solid gray circle. The mobile device 102 is operable to detect a relative location, intensity, distribution, length of time, and frequency of the user interactions. Further in this example, the mobile device 102 implements techniques to suppress outlier instances of proximity-based input, such as an "accidental" touch depicted at 312. Accordingly, based on the user interactions, the mobile device 102 determines one or more control regions 208. In this example, a first control region 314 and a second control region 316 are depicted as the areas enclosed by the dashed circles.

As illustrated in third stage 306, the mobile device 102 identifies one or more control graphics 212 that correspond to the first control region 314 and the second control region 316. The mobile device 102 is operable to implement a variety of strategies to determine the control graphics 212, such as an epicenter/centroid-comparison technique as described above in further detail. In this example, the control graphics 212 include a brake pedal graphic 318 that corresponds to the first control region 314 and a gas pedal graphic 320 that corresponds to the second control region 316.

As shown in fourth stage 308, the mobile device 102 generates a controller graphical user interface 124 by filtering the digital content from the gaming application to display the control graphics 212, e.g., the brake pedal graphic 318 and the gas pedal graphic 320. Accordingly, the mobile device 102 displays the controller graphical user interface 124 and causes the gaming application to be displayed on the display device 104. In this way, the user is able to control gameplay of the gaming application from the mobile device 102, while viewing the gameplay on the larger remote screen of the display device 104. Thus, the techniques described herein enable generation of a controller graphical user interface 124 that conserves computational resources and enhances a user experience such as by improving the visual quality of a gaming experience and reducing lag.

FIG. 4 depicts an example implementation 400 for controller graphical user interface based on interaction data including updating a controller graphical user interface in first stage 402 and second stage 404. As depicted in first stage 402, a mobile device establishes a content connectivity session 202 with a display device 104. As part of the content connectivity session 202, the mobile device 102 communicates digital content from an application 114 to the display device 104, which in this example is a soccer gaming application. In this example, a user 108 of the mobile device 102 has accessed the soccer game application as part of a previous content connectivity session and the mobile device 102 is configured to initially display a controller graphical user interface 124 generated in accordance with the techniques described above based on the previous content connectivity session. Accordingly, the controller graphical user interface 124 includes control graphics 212 such as an aim graphic 406 and a shoot graphic 408.

As further illustrated in first stage 402, an instance 410 of proximity-based input is depicted as a user input to touch the input surface 118, however the location of the user input is above the shoot graphic 408. Although not depicted, in this example the mobile device 102 monitors a plurality of user inputs that are above and/or near the top of the current location of the shoot graphic 408. The mobile device 102 is then operable to determine updated control regions based on such user inputs.

As shown in second stage 404, the mobile device 102 generates an updated controller graphical user interface based on the updated control regions. For instance, the mobile device 102 edits the shoot graphic 408 in the controller graphical user interface based on the updated control regions to be larger and located higher than the shoot graphic 408. Thus, the updated controller graphical user interface includes an updated shoot graphic 412 based on user behavior, and in this way the techniques described herein support user-specific adaptable gameplay.

As further illustrated in second stage 404, the mobile device 102 edits the application content 204 communicated to the display device 104. For instance, the mobile device filters out the aim graphic 406 and the updated shoot graphic 412, such as by using one or more of the filtering techniques described above. Accordingly, the application content 204 communicated to the display device 104 in second stage 404 includes an enhanced view of the digital content of the application 114 without visual obstruction of the aim graphic 406 and the updated shoot graphic 412. Accordingly, the techniques described herein support an enhanced user experience, for instance by allowing the user 108 to view regions of the application that were previously covered by the aim graphic 406 and the shoot graphic 408, such as the lower left and lower right corners of the goal.

Figure 5:
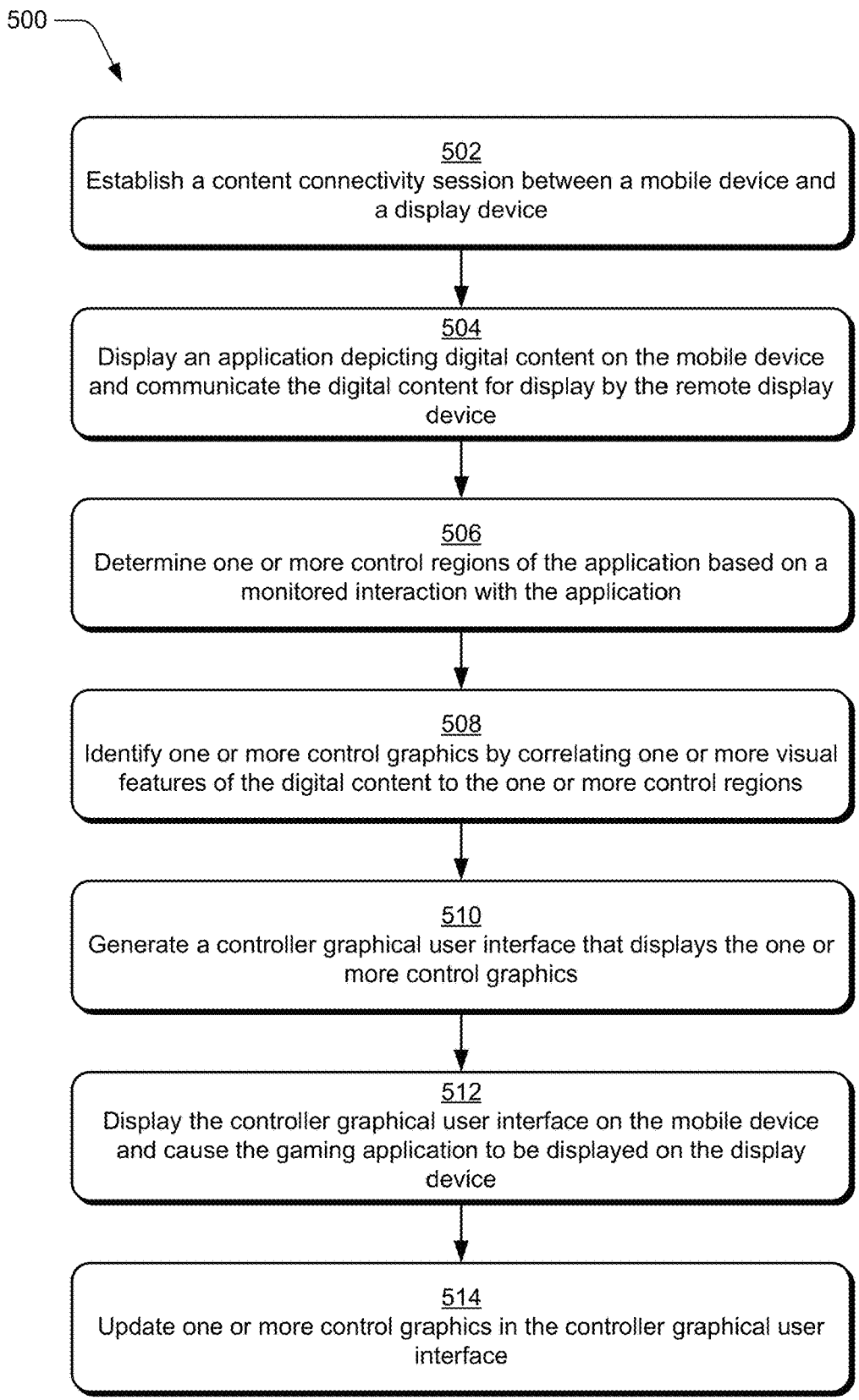
FIG. 5 illustrates a flow chart depicting an example method for controller graphical user interface based on interaction data in accordance with one or more implementations.

FIG. 5 illustrates a flow chart depicting an example method 500 for controller graphical user interface based on interaction data in accordance with one or more implementations. At 502, a content connectivity session is established between a mobile device and a display device. The content connectivity session 202, for instance, enables the mobile device 102 to transmit content to the display device 104 for output via wireless and/or wired connectivity. In various examples, the content connectivity session 202 is initiated by the user, for instance responsive to a user prompt. In alternative or additional examples, the content connectivity session 202 is established automatically and without user intervention, such as responsive to the launch of a particular application.

At 504, an application depicting digital content is displayed by the mobile device. As part of the content connectivity session 202, the digital content is further communicated to the display device 104. In various implementations, the application 114 represents a mobile gaming application of the mobile device 102. The mobile device 102 is operable to configure the digital content for display by the display device 104, such as adjusting an aspect ratio and/or resolution of the digital content.

At 506, one or more control regions of the application are determined based on a monitored interaction with the application. Generally, the control regions 208 correspond to one or more spatial locations of a graphical user interface of the application 114, such that actuation of one or more of the control regions 208 causes a corresponding action to be performed in the application 114. The mobile device 102 monitors proximity-based input to an input surface 118 of the mobile device 102, such as stylus input, user touch input, contactless input based on proximity of a user's finger and/or a stylus to the mobile device 102, and so forth to determine the one or more control regions 208.

For instance, the mobile device 102 is operable to detect, using one or more touch sensors of the input surface 118, a location, intensity, distribution, length of time, frequency, etc. of instances proximity-based input. The control regions 208 can further be determined based in whole or in part on one or more additional factors, such as preferences associated with a user 108 of the mobile device 102, saved data associated with the user 108 (e.g., based on a previous content connectivity session), metadata associated with the application 114 (e.g., global information from a plurality of users of the application), etc.

At 508, one or more control graphics are identified by correlating visual features of the digital content to the one or more control regions. Generally, the control graphics 212 refer to visual representations of the control regions 208. For instance, the control graphics 212 are visual features of the application 114 that denote a control region 208, such as a visual representation of an action button, directional pad, digital joystick, selectable menu, etc. Various strategies and techniques are considered to determine the one or more control graphics 212.

In one example, the one or more control graphics 212 are determined based in part on a configuration session that includes receiving user input to identify the one or more control regions 208 and/or the control graphics 212. In an additional or alternative example, the mobile device 102 leverages a digital image segmentation algorithm to segment the digital content of the application 114 into constituent visual features. The mobile device 102 then determines a closest constituent visual feature to an epicenter of each control region 208. In yet another example, the mobile device 102 implements one or more image recognition techniques to identify visual features that correspond to the one or more control regions 208.

At 510, a controller graphical user interface is generated. For instance, the mobile device 102 does so by filtering the digital content to display the one or more control graphics 212. In one example, the mobile device 102 generates the controller graphical user interface 124 by capturing a screenshot of the digital content of the application 114 and filtering out regions of the screenshot that do not correspond to the one or more control graphics 212. Further techniques for generating the controller graphical user interface 124 are considered, such as using an image segmentation algorithm and/or image masking techniques.

At 512, the controller graphical user interface is displayed by the mobile device. Further, the mobile device 102 causes application content 204 to be displayed by the display device 104. In some implementations, the application content 204 includes an unedited depiction of the application 114. In another example, the mobile device 102 edits the digital content communicated to the display device 104 by filtering out one or more of the control graphics 212, such as by using one or more of the filtering techniques described above.

At 514, one or more of the control graphics are updated in the controller graphical user interface. For instance, a position, size, orientation, location, and/or appearance of the one or more control graphics 212 are edited based on a subsequent monitored interaction. In this way, the controller graphical user interface 124 is iteratively updated to adapt to user behaviors. This functionality is further discussed below with respect to FIG. 6.

Figure 6:
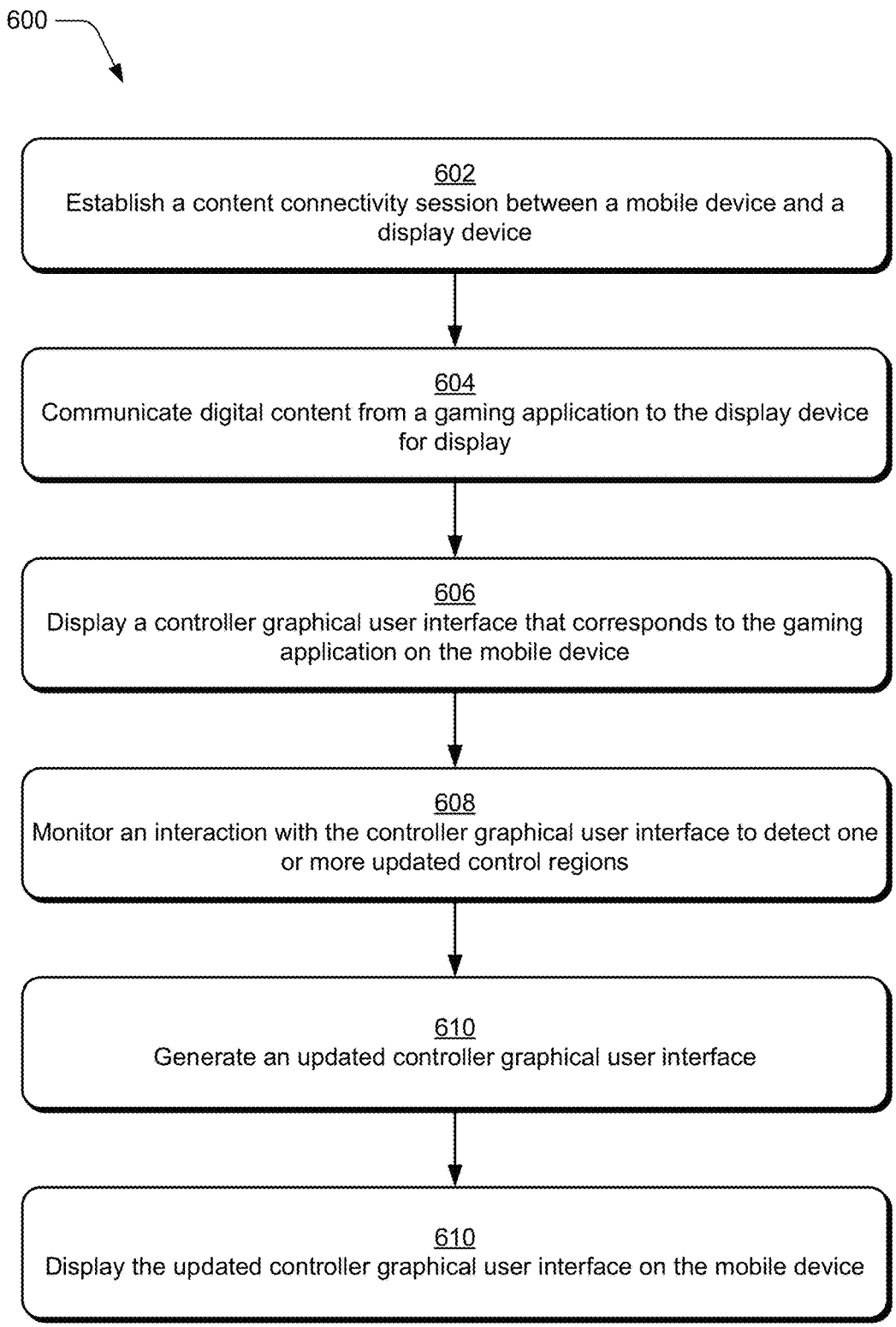
FIG. 6 illustrates a flow chart depicting an example method for controller graphical user interface based on interaction data including updating a controller graphical user interface in accordance with one or more implementations.

FIG. 6 illustrates a flow chart depicting an example method 600 for controller graphical user interface based on interaction data including generating an updated controller graphical user interface. At 602, a content connectivity session is established between a mobile device and a display device. The content connectivity session 202, for instance, enables the mobile device 102 to transmit content to the display device 104 for output via wireless and/or wired connectivity. At 604, digital content from an application 114 is communicated to the display device 104 for display. In an example, the application 114 is a gaming application such as a mobile gaming application.

At 606, a controller graphical user interface that corresponds to the application is displayed on the mobile device. The controller graphical user interface 124, for instance, includes one or more control graphics 212 that correspond to one or more control regions 208 of the application 114 in accordance with the techniques described above.

At 608, an interaction with the controller graphical user interface is monitored to detect one or more updated control regions. Generally, the updated control regions represent one or more spatial locations that are different than the previously determined control regions 208. The mobile device 102 monitors proximity-based input to an input surface 118 of the mobile device 102, such as stylus input, user touch input, contactless input based on proximity of a user's finger and/or a stylus to the mobile device 102, and so forth, to determine the updated control regions. Any suitable technique that can be used to determine the control regions 208 can be implemented to determine the updated control regions.

At 610, an updated controller graphical user interface is generated. For instance, the mobile device 102 edits the one or more control graphics 212 in the controller graphical user interface 124 based on the one or more updated control regions. In an example, the mobile device 102 edits the position, size, orientation, location, and/or appearance of one or more of the control graphics 212 included in the controller graphical user interface 124. At 612, the updated controller graphical user interface is displayed by the mobile device 102. Further, the mobile device 102 causes the application 114 to be displayed by the display device 104. This process can be performed iteratively throughout the course of the content connectivity session 202, and thus the controller graphical user interface 124 is adaptable to ongoing gameplay.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 7:
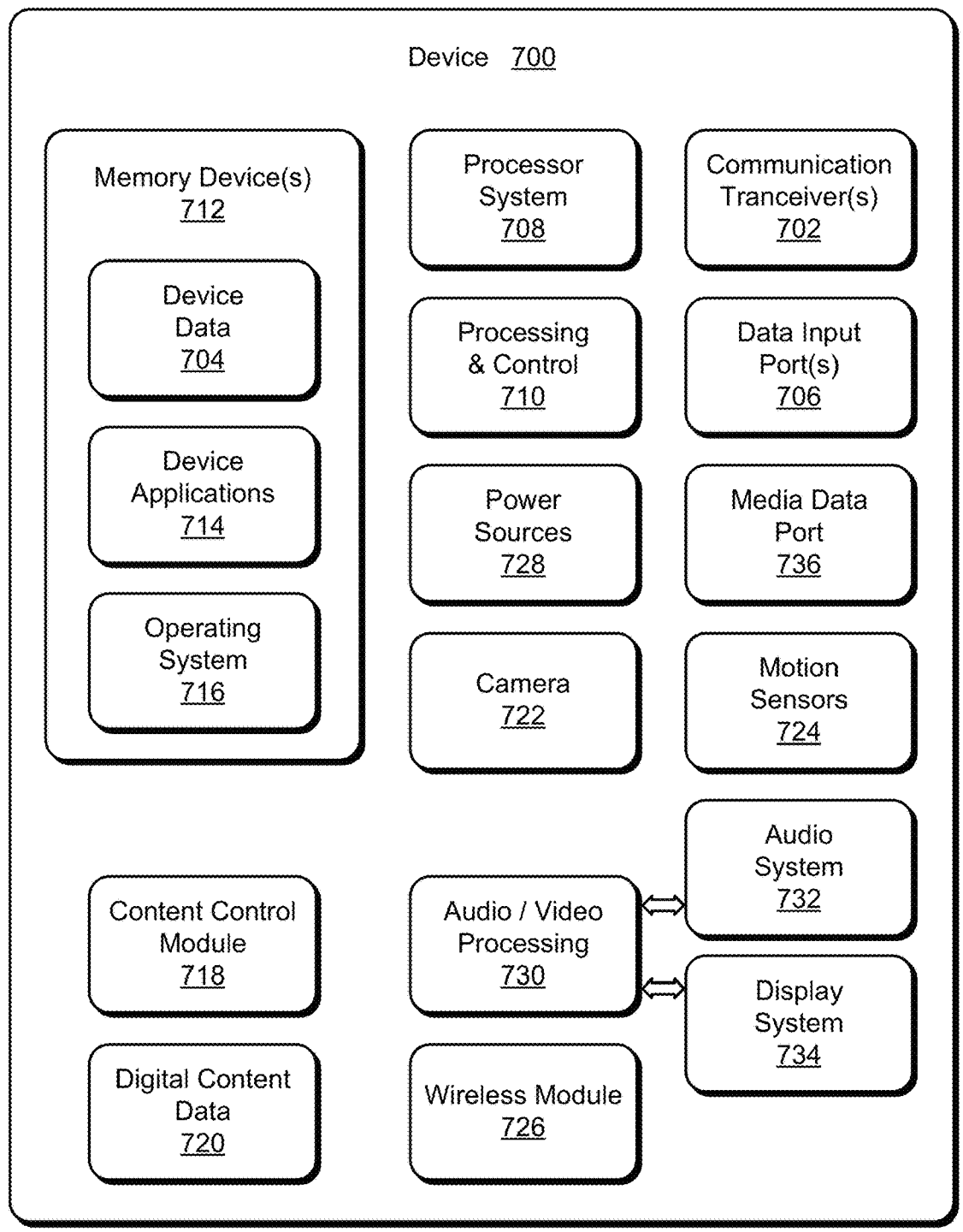
FIG. 7 illustrates various components of an example device in which aspects of controller graphical user interface based on interaction data can be implemented.

FIG. 7 illustrates various components of an example device 700 in which aspects of controller graphical user interface based on interaction data can be implemented. The example device 700 can be implemented as any of the devices described with reference to the previous FIGS. 1-6, such as any type of mobile device, mobile phone, mobile device, wearable device, tablet, computing, communication, entertainment, gaming, media playback, and/or other type of electronic device. For example, the mobile device 102 as shown and described with reference to FIGS. 1-6 may be implemented as the example device 700.

The device 700 includes communication transceivers 702 that enable wired and/or wireless communication of device data 704 with other devices. The device data 704 can include any of device identifying data, device location data, wireless connectivity data, and wireless protocol data. Additionally, the device data 704 can include any type of audio, video, and/or image data. Example communication transceivers 702 include wireless personal area network (WPAN) radios compliant with various IEEE 702.15 (Bluetooth™) standards, wireless local area network (WLAN) radios compliant with any of the various IEEE 702.11 (Wi-Fi™) standards, wireless wide area network (WWAN) radios for cellular phone communication, wireless metropolitan area network (WMAN) radios compliant with various IEEE 702.16 (WiMAX™) standards, and wired local area network (LAN) Ethernet transceivers for network data communication.

The device 700 may also include one or more data input ports 706 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 700 includes a processing system 708 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 710. The device 700 may further include any type of a system bus or other data and command transfer system that couples the various components within the device. A system bus can include any one or combination of different bus structures and architectures, as well as control and data lines.

The device 700 also includes computer-readable storage memory 712 (e.g., memory devices) that enable data storage, such as data storage devices that can be accessed by a computing device, and that provide persistent storage of data and executable instructions (e.g., software applications, programs, functions, and the like). Examples of the computer-readable storage memory 712 include volatile memory and non-volatile memory, fixed and removable media devices, and any suitable memory device or electronic data storage that maintains data for computing device access. The computer-readable storage memory can include various implementations of random-access memory (RAM), read-only memory (ROM), flash memory, and other types of storage media in various memory device configurations. The device 700 may also include a mass storage media device.

The computer-readable storage memory 712 provides data storage mechanisms to store the device data 704, other types of information and/or data, and various device applications 714 (e.g., software applications). For example, an operating system 716 can be maintained as software instructions with a memory device and executed by the processing system 708. The device applications may also include a device manager, such as any form of a control application, software application, signal-processing and control module, code that is native to a particular device, a hardware abstraction layer for a particular device, and so on. Computer-readable storage memory 712 represents media and/or devices that enable persistent and/or non-transitory storage of information in contrast to mere signal transmission, carrier waves, or signals per se. Computer-readable storage memory 712 do not include signals per se or transitory signals.

In this example, the device 700 includes a content control module 718 that implements aspects of controller graphical user interface based on interaction data and may be implemented with hardware components and/or in software as one of the device applications 714. In an example, the content control module 718 can be implemented as the content control module 116 described in detail above. In implementations, the content control module 718 may include independent processing, memory, and logic components as a computing and/or electronic device integrated with the device 700. The device 700 also includes digital content data 720 for implementing aspects of controller graphical user interface based on interaction data and may include data from and/or utilized by the content control module 718.

In this example, the example device 700 also includes a camera 722 and motion sensors 724, such as may be implemented in an inertial measurement unit (IMU). The motion sensors 724 can be implemented with various sensors, such as a gyroscope, an accelerometer, and/or other types of motion sensors to sense motion of the device. The various motion sensors 724 may also be implemented as components of an inertial measurement unit in the device.

The device 700 also includes a wireless module 726, which is representative of functionality to perform various wireless communication tasks. For instance, for the mobile device 102, the wireless module 726 can be leveraged to scan for and detect wireless networks, as well as negotiate wireless connectivity to wireless networks for the mobile device 102. The device 700 can also include one or more power sources 728, such as when the device is implemented as a mobile device. The power sources 728 may include a charging and/or power system, and can be implemented as a flexible strip battery, a rechargeable battery, a charged super-capacitor, and/or any other type of active or passive power source.

The device 700 also includes an audio and/or video processing system 730 that generates audio data for an audio system 732 and/or generates display data for a display system 734. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 736. In implementations, the audio system and/or the display system are integrated components of the example device. Alternatively, the audio system and/or the display system are external, peripheral components to the example device.

Although implementations of controller graphical user interface based on interaction data have been described in language specific to features and/or methods, the subject of the appended claims is not necessarily limited to the specific features or methods described. Rather, the features and methods are disclosed as example implementations of controller graphical user interface based on interaction data, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a computing device, including: a content control module implemented at least partially in hardware and configured to: establish a content connectivity session between the computing device and a remote display device: display digital content from a gaming application on the computing device and communicate the digital content for display by the remote display device as part of the content connectivity session: determine one or more control regions of the gaming application based on a monitored interaction with the gaming application via one or more touch sensors of the computing device; identify one or more control graphics by correlating one or more visual features of the digital content to the one or more control regions: generate a controller graphical user interface by filtering the digital content to display the one or more control graphics; and display the controller graphical user interface on the computing device and cause the gaming application to be displayed on the remote display device.

In some aspects, the techniques described herein relate to a computing device, wherein the content connectivity session is established automatically and without user intervention responsive to the gaming application being launched by the computing device.

In some aspects, the techniques described herein relate to a computing device, wherein the one or more control regions are determined based on a frequency of touch by a user that is a subject of the monitored interaction.

In some aspects, the techniques described herein relate to a computing device, wherein the one or more control regions are determined based in part on saved data associated with a user of the computing device based on a previous content connectivity session.

In some aspects, the techniques described herein relate to a computing device, wherein the one or more control graphics are identified in part using image recognition techniques to identify one or more candidate visual features that likely correspond to the one or more control regions.

In some aspects, the techniques described herein relate to a computing device, wherein the one or more control graphics are identified by segmenting the digital content into constituent visual features, calculating an epicenter of each control region of the one or more control regions, and determining a closest constituent visual feature to the epicenter of each control region.

In some aspects, the techniques described herein relate to a computing device, wherein to generate the controller graphical user interface includes capturing a screenshot of the digital content and filtering out regions of the screenshot that do not correspond to the one or more control graphics.

In some aspects, the techniques described herein relate to a computing device, wherein the content control module is further configured to update a location of the one or more control graphics relative to the controller graphical user interface based on a subsequent monitored interaction.

In some aspects, the techniques described herein relate to a computing device, wherein the one or more control graphics are determined based in part on a configuration session that includes receiving user input to the computing device to identify the one or more control regions.

In some aspects, the techniques described herein relate to a method, including: displaying an application depicting digital content on a mobile device and communicating the digital content for display by a remote display device as part of a content connectivity session: determining one or more control regions of the application based on a monitored interaction with a user interface of the mobile device via one or more touch sensors of the mobile device: identifying one or more control graphics by correlating visual features of the digital content to the one or more control regions; generating a controller graphical user interface that displays the one or more control graphics; and displaying the controller graphical user interface on the mobile device and the application on the remote display device.

In some aspects, the techniques described herein relate to a method, wherein the content connectivity session is established automatically and without user intervention responsive to the application being launched by the mobile device.

In some aspects, the techniques described herein relate to a method, wherein the one or more control regions are determined based on a frequency of touch by a user that is a subject of the monitored interaction.

In some aspects, the techniques described herein relate to a method, wherein the one or more control regions are determined based in part on saved data associated with a user of the mobile device based on a previous content connectivity session.

In some aspects, the techniques described herein relate to a method, wherein the one or more control graphics are identified based in part using image recognition techniques to identify one or more candidate visual features that likely correspond to the one or more control regions.

In some aspects, the techniques described herein relate to a method, wherein the one or more control graphics are identified by segmenting the digital content into constituent visual features, calculating an epicenter of each control region of the one or more control regions, and determining a closest constituent visual feature to the epicenter of each control region.

In some aspects, the techniques described herein relate to a method, wherein generating the controller graphical user interface includes capturing a screenshot of the digital content and filtering out regions of the screenshot that do not correspond to the one or more control graphics.

In some aspects, the techniques described herein relate to a method, further including updating a location of the one or more control graphics relative to the controller graphical user interface based on a subsequent monitored interaction.

In some aspects, the techniques described herein relate to a system, including: one or more processors; and one or more computer-readable storage media storing instructions that are executable by the one or more processors to: establish a content connectivity session between a mobile device and a remote display device; communicate digital content from a gaming application to the remote display device for display: display a controller graphical user interface that corresponds to the gaming application on the mobile device as part of a content connectivity session, the controller graphical user interface including one or more control graphics that correspond to one or more control regions of the gaming application; monitor an interaction with the controller graphical user interface displayed by the mobile device to detect one or more updated control regions; generate an updated controller graphical user interface by editing the one or more control graphics in the controller graphical user interface based on the one or more updated control regions; and display the updated controller graphical user interface on the mobile device.

In some aspects, the techniques described herein relate to a system, wherein to generate the updated controller graphical user interface includes editing a location of the one or more control graphics relative to the controller graphical user interface.

In some aspects, the techniques described herein relate to a system, wherein to generate the updated controller graphical user interface includes editing a size of the one or more control graphics based on the one or more updated control regions.

The invention claimed is:

1. A computing device, comprising:
a content control module implemented at least partially in hardware and configured to:
establish a content connectivity session between the computing device and a remote display device;
display digital content from a gaming application on the computing device and communicate the digital content for display by the remote display device as part of the content connectivity session;
determine, via one or more touch sensors of the computing device, one or more control regions of the gaming application based on a frequency of touch of a user as part of a monitored interaction with the gaming application;
segment the digital content from the gaming application into constituent visual features;
calculate a centroid for each of the constituent visual features and an epicenter of each control region of the one or more control regions;
identify one or more control graphics by correlating one or more of the centroids to one or more of the epicenters;
generate a controller graphical user interface by filtering the digital content to display the one or more control graphics and suppress display of portions of the digital content extraneous to the one or more control graphics; and
display the controller graphical user interface on the computing device and cause the gaming application to be displayed on the remote display device.

2. The computing device as described in claim 1, wherein the content connectivity session is established automatically and without user intervention responsive to the gaming application being launched by the computing device.

3. The computing device as described in claim 1, wherein the one or more control regions are determined based in part on saved data associated with a user of the computing device based on a previous content connectivity session.

4. The computing device as described in claim 1, wherein the one or more control graphics are identified in part using image recognition techniques to identify one or more candidate visual features that likely correspond to the one or more control regions.

5. The computing device as described in claim 1, wherein to generate the controller graphical user interface includes capturing a screenshot of the digital content and filtering out regions of the screenshot that do not correspond to the one or more control graphics.

6. The computing device as described in claim 1, wherein the content control module is further configured to update a location of the one or more control graphics relative to the controller graphical user interface based on a subsequent monitored interaction.

7. The computing device as described in claim 1, wherein the one or more control graphics are determined based in part on a configuration session that includes receiving user input to the computing device to identify the one or more control regions.

8. A method, comprising:
displaying an application depicting digital content on a mobile device and communicating the digital content for display by a remote display device as part of a content connectivity session;
determining one or more control regions of the application based on a monitored interaction with a user interface of the mobile device via one or more touch sensors of the mobile device;
identifying one or more control graphics by:
segmenting the digital content into constituent visual features;
calculating an epicenter of each control region of the one or more control regions and a centroid of each of the constituent visual features; and
identifying centroids of the constituent visual features that correspond to the epicenters of the one or more control regions;
generating a controller graphical user interface that displays the one or more control graphics and suppresses display of portions of the digital content extraneous to the one or more control graphics; and
displaying the controller graphical user interface on the mobile device and the application on the remote display device.

9. The method as described in claim 8, wherein the content connectivity session is established automatically and without user intervention responsive to the application being launched by the mobile device.

10. The method as described in claim 8, wherein the one or more control regions are determined based on a frequency of touch by a user that is a subject of the monitored interaction.

11. The method as described in claim 8, wherein the one or more control regions are determined based in part on saved data associated with a user of the mobile device based on a previous content connectivity session.

12. The method as described in claim 8, wherein the one or more control graphics are identified based in part using image recognition techniques to identify one or more candidate visual features that likely correspond to the one or more control regions.

13. The method as described in claim 8, wherein generating the controller graphical user interface includes capturing a screenshot of the digital content and filtering out regions of the screenshot that do not correspond to the one or more control graphics.

14. The method as described in claim 8, further comprising updating a location of the one or more control graphics relative to the controller graphical user interface based on a subsequent monitored interaction.

15. A system, comprising:
one or more processors; and
one or more computer-readable storage media storing instructions that are executable by the one or more processors to:
establish a content connectivity session between a mobile device and a remote display device;
communicate digital content from a gaming application to the remote display device for display;
generate a controller graphical user interface that corresponds to the gaming application for display by the mobile device as part of a content connectivity session, the controller graphical user interface including one or more control graphics that have centroids that correspond to epicenters of one or more control regions of the gaming application and suppresses display of portions of the digital content extraneous to the one or more control graphics;
monitor an interaction with the controller graphical user interface displayed by the mobile device to detect one or more updated control regions;
generate an updated controller graphical user interface by editing the one or more control graphics in the controller graphical user interface based on the one or more updated control regions; and
display the updated controller graphical user interface on the mobile device.

16. The system as described in claim 15, wherein to generate the updated controller graphical user interface includes editing a location of the one or more control graphics relative to the controller graphical user interface.

17. The system as described in claim 15, wherein to generate the updated controller graphical user interface includes editing a size of the one or more control graphics based on the one or more updated control regions.

18. The computing device as described in claim 1, wherein the one or more control regions are further determined based on a distribution of touch of the user as part of the monitored interaction.

19. The method as described in claim 8, wherein the determining the one or more control regions includes generating a heat map based on one or more instances of proximity-based input to the mobile device as part of the monitored interaction.

20. The method as described in claim 8, wherein the determining the one or more control regions includes implementing a control region algorithm that applies weights to each instance of proximity-based input detected over a period of time.

* * * * *